(12) United States Patent
Jensen

(10) Patent No.: US 8,600,980 B2
(45) Date of Patent: Dec. 3, 2013

(54) CONSOLIDATED INFORMATION RETRIEVAL RESULTS

(75) Inventor: Lee Samuel Jensen, Provo, UT (US)

(73) Assignee: Ancestry.com Operations Inc., Provo, UT (US)

(*) Notice: Subject to any disclaimer, the term of this patent is extended or adjusted under 35 U.S.C. 154(b) by 0 days.

(21) Appl. No.: 13/422,245

(22) Filed: Mar. 16, 2012

(65) Prior Publication Data

US 2012/0197882 A1 Aug. 2, 2012

Related U.S. Application Data

(63) Continuation of application No. 12/758,238, filed on Apr. 12, 2010, now Pat. No. 8,140,512.

(51) Int. Cl.
*G06F 17/30* (2006.01)

(52) U.S. Cl.
USPC ........... 707/722; 707/706; 707/713; 707/736; 707/758; 707/781

(58) Field of Classification Search
USPC .................................. 707/600–899
See application file for complete search history.

(56) References Cited

U.S. PATENT DOCUMENTS

| | | | |
|---|---|---|---|
| 7,953,684 B2 | 5/2011 | Jia | |
| 8,140,512 B2 | 3/2012 | Jensen | |
| 2009/0292696 A1* | 11/2009 | Shuster | ............................. 707/5 |

* cited by examiner

*Primary Examiner* — Isaac M Woo
(74) *Attorney, Agent, or Firm* — Kilpatrick Townsend & Stockton LLP

(57) ABSTRACT

Systems and methods are disclosed for consolidating information retrieval results. According to some embodiments of the invention, a computer system can be used to create a result set in response to a query. Results in the result set can then be compared with each other to determine whether they contain information regarding a single object or entity, in which case the records are consolidated and redundant data is removed. The computer system can then present the consolidated result on a display.

20 Claims, 7 Drawing Sheets

CONSOLIDATED INFORMATION RETRIEVAL RESULTS

CROSS-REFERENCE TO RELATED APPLICATION

This application is a continuation of U.S. patent application Ser. No. 12/758,238, filed Apr. 12, 2010, by Lee Samuel Jensen, which will issue as U.S. Pat. No. 8,140,512 on Mar. 20, 2012, which is incorporated by reference in their entirety herein for all purposes.

BACKGROUND OF THE INVENTION

This invention relates generally to information retrieval. More specifically, the invention relates to computer-readable media, systems, and methods of consolidating information retrieval results.

Information retrieval, generally speaking, is commonly-used among researchers and consumers of information to obtain information from one or more databases. This typically involves a user submitting a query, which is then used by a information retrieval system to pull results from the one or more databases and report the results base to the user. The popularity of the Internet has caused such information retrieval and information retrieval systems to become common even among ordinary Internet users.

Despite their popularity, information retrieval systems do not always present search results to a user an efficient format, which can become a burden to the user. For example, consider FIG. 1A. FIG. 1A is an image of search results provided in a typical format. In this format, each distinct related data point is listed separately, often times interspersed with unrelated data. FIG. 1B, shows another image of search results, demonstrating an alternative approach to displaying search results. In this instance, each distinct related data point is clustered together as a list of related data. Although this latter approach may be considered more efficient in some aspects, it is still prone to the problems of displaying redundant data points.

This invention serves to reduce the amount of redundancies found in information retrieval results and provide a more efficient display of related data elements, among other purposes.

BRIEF SUMMARY OF THE INVENTION

Systems and methods are disclosed for consolidating information retrieval results. According to some embodiments of the invention, a computer system can be used to retrieve a first result set in response to a search query. The computer system can then rank each result in the first result set according to how well each result matched the terms in the search query. The computer system can then perform a more in-depth comparison of the results with the query to determine a more complete correlation of the data in the result with the terms in the search query. This can include comparing the terms in the search query to additional elements of data in each result. Each result can then be scored according to its correlation with the search query, and results that do not meet minimum threshold score can be dropped, the remaining results comprising a second result set. Each of the remaining results in the second result set can then be compared with each other to determine whether they contain information regarding a single object or entity, in which case the records are consolidated and redundant data is removed. The computer system can then present the consolidated result on a display.

According to some embodiments of the invention, the computer system can display more than one consolidated result. For example, the results in the second result set may contain information regarding more than one distinct object or entity that is relevant to the search query. This allows for multiple consolidated results, which can be displayed by the computer system. Furthermore, results in the second result set that are not consolidated but may contain information about an object or entity that is relevant to the search query can also be displayed. In these instances, the computer system can rank the results, consolidated or not, to display the results in a particular order, such as relevance to the search query.

In some embodiments of the invention, these computer-readable media, systems, and methods further may be used to retrieve results from a collection of records having a common schema. The data can further include a variety of data types. For example, the invention may consolidate results having data including names, dates, places, photographs, stories, military status, price, reviews, relationships, phone numbers, identification numbers, race, gender, residence, employer, employment, education, criminal records, tax records, religion, political service, dimensions, medical records, and DNA sequences.

Further embodiments of the invention provide for the use of weighted values which can be used in the ranking and scoring of results in a results set. For example, different terms in a search query and/or different data elements in a result can be given a different weighted value. These values can further be used to calculate a total score or value for a result in a result set.

BRIEF DESCRIPTION OF THE DRAWINGS

A further understanding of the nature and advantages of the present invention may be realized by reference to the following drawings. In these figures, similar components or features may have the same reference label. Further, various components of the same type may be distinguished by following the reference label by a second label that distinguishes among the similar components.

DETAILED DESCRIPTION OF THE INVENTION

Figure 1A:
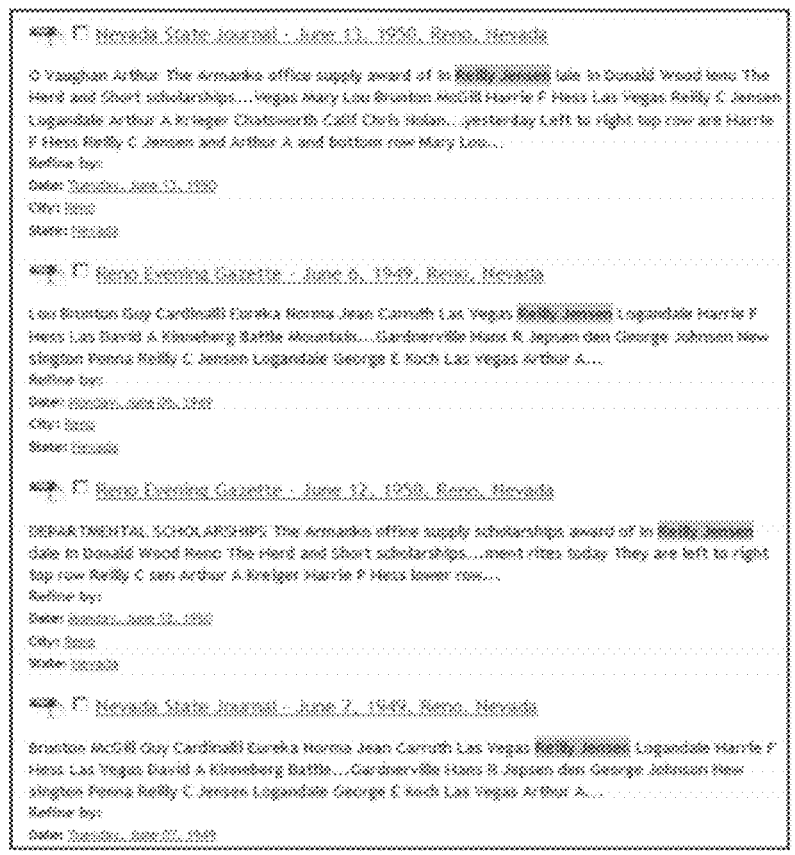
FIG. 1A is an image of search results from an information retrieval system listing each related data point separately, according to the prior art.
Figure 1B:
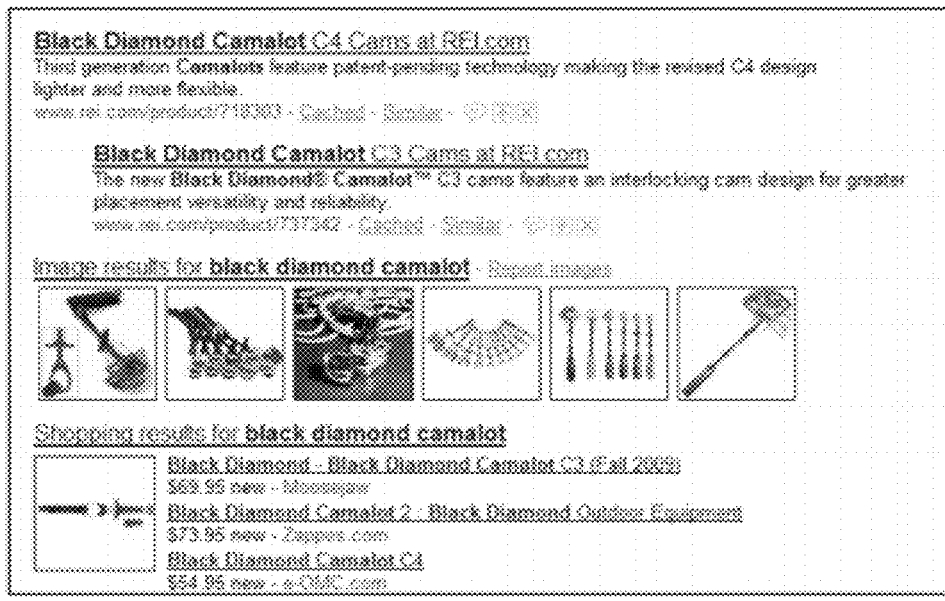
FIG. 1B is an image of search results from an information retrieval system clustering related data points together, according to the prior art.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provide solutions (including without limitation, devices, systems, methods, software programs, and the like) for consolidating information retrieval results. In some embodiments, a collection of data can be indexed by an information retrieval system, the collection of data having some degree of duplication. Such duplication can exist, for example, between of records or results representing the same entity or topic. However, each of the duplicated results may contain distinct information that is not contained in any of the other duplicate results. In response to a query, the information retrieval system dynamically determines what results match the query and then creates a consolidated representation of all the duplicate results for the same entity or topic within that matching set. The consolidated result can provide a distinct single data element for all duplicated data elements, but retains a count and source of records representing each consolidated data element. That count can be used later on for scoring the probability of a match to the query. Once the results have all been consolidated, the consolidated results then can be scored against the query and a rank order can be determined. The consolidated results then can be displayed to a user.

The consolidated representation allows for a more compact display of the matching results that allows the user to see more information and evaluate the results faster. By not only clustering the results, but merging the data represented by the results, data can be presented in a consolidated form that is easier for the user to visualize and compare. Duplicate information can be removed from the display and therefore more information can be displayed. Popularity of the information, i.e. the number of results representing the same information, and completeness of the consolidated result can also be used in determining the ranking order of displayed results.

Figure 2:
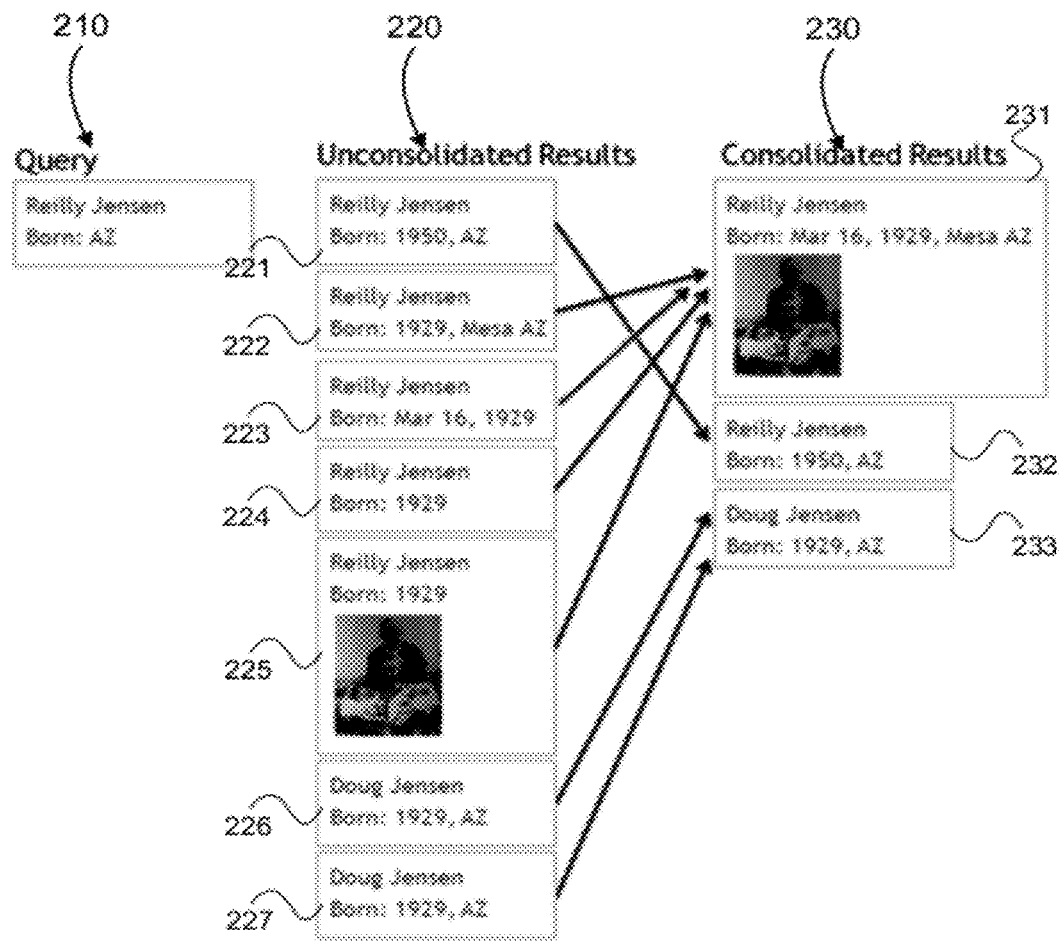
FIG. 2 is a simplified representation of how an embodiment of the invention can consolidate query results.

FIG. 2 presents a simplified illustration of how results can be consolidated according to certain embodiments of the invention. In this example, the information retrieval system receives a query 210 and searches one or more databases containing records that represent people. The information retrieval system provides a result set comprising many unconsolidated results 220, some of which contain duplicative information. According to some embodiments of the invention, these unconsolidated results 220 can comprise a subset of results from a larger result set, wherein this subset includes results having a high correlation and/or relevance to the query.

The information retrieval system can then consolidate the results. In the example illustrated in FIG. 2, unconsolidated results 222, 223, 224, and 225 contain duplicative information about a particular person named Reilly Jensen. The duplicative information includes the name and birth year, which are found in all four records. When consolidating unconsolidated results 220, the information retrieval system can use this duplicative information to determine whether these results contain information regarding a distinct entity or topic. Once that determination is made, the information retrieval system then combines the records and removes redundant information to create a single consolidated result for that person 231. FIG. 2 further illustrates how the information retrieval system can also identify unconsolidated results that may have a high degree of relevance and/or correlation to the query, such as unconsolidated result 221, and display them in a final results list, as demonstrated by result 232. In addition, or alternatively, final consolidated results list 230 may include multiple consolidated results. As illustrated in FIG. 2, consolidated result 231 includes information from unconsolidated results 222, 223, 224, and 225, as explained above, and additional consolidated result 233 includes information from unconsolidated results 226 and 227.

Figure 3:
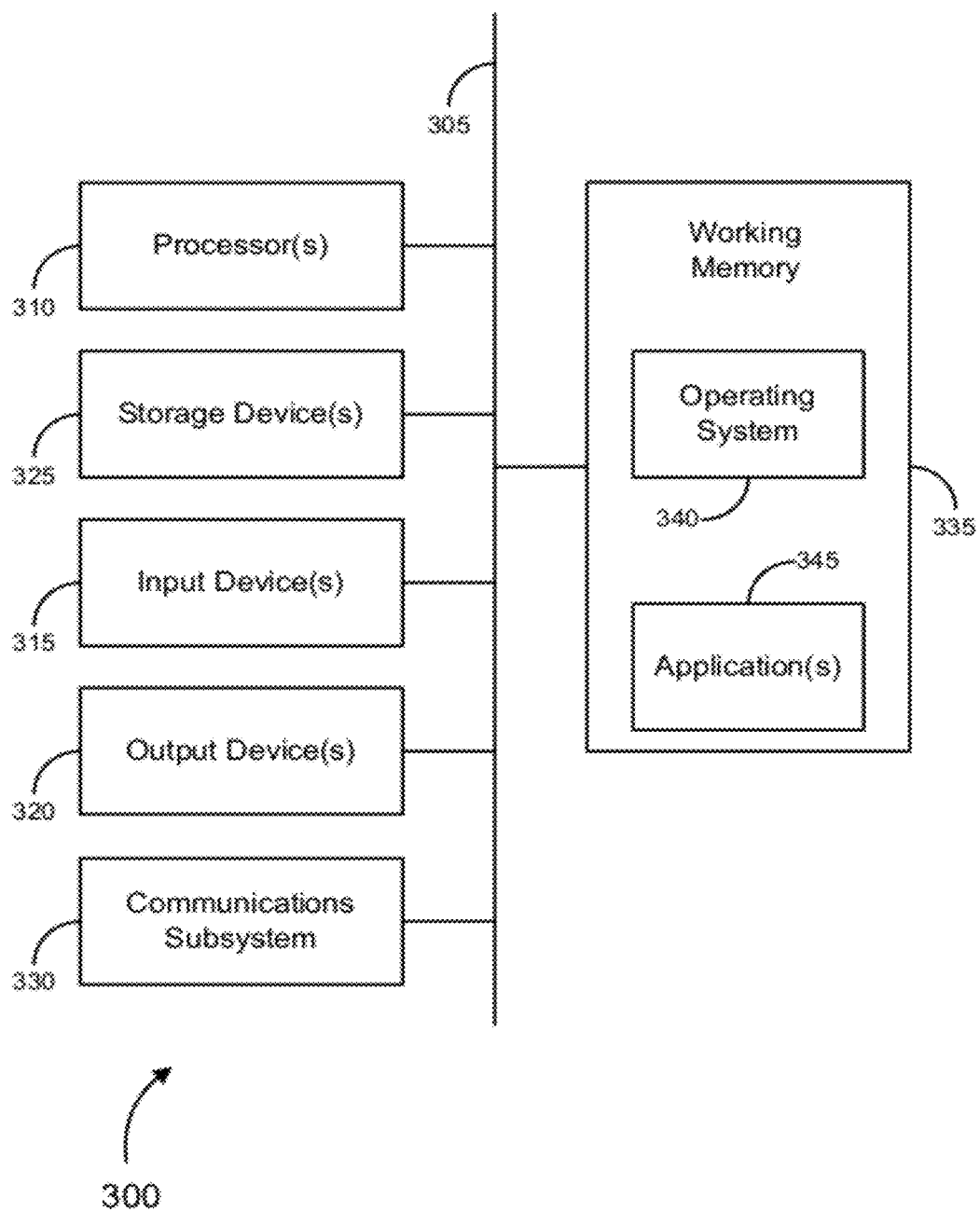
FIG. 3 is a simplified block diagram of an embodiment of a computer system that can be used in consolidating information retrieval results, according to some embodiments of the invention.

FIG. 3 provides a schematic illustration of one embodiment of a computer system 300 that can perform the methods of the invention, as described herein, and/or can function as, for example, an information retrieval system or a terminal communicatively connected with an information retrieval system. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including, without limitation, one or more general-purpose processors and/or one or more special-purpose processors (such as digital signal processing chips, graphics acceleration chips, and/or the like); one or more input devices 315, which can include, without limitation, a mouse, a keyboard and/or the like; and one or more output devices 320, which can include, without limitation, a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network, and/or any other devices described herein. In many embodiments, the computer system 300 will further comprise a working memory 335, which can include a RAM or ROM device, as described above.

The computer system 300 can also comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 325 described above. In some cases, the storage medium might be incorporated within a computer system, such as the system 300. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium," "computer-readable medium," and "computer-readable storage medium," as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation, dynamic memory, such as the working memory 335. Transmission media includes coaxial cables, copper wire, and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
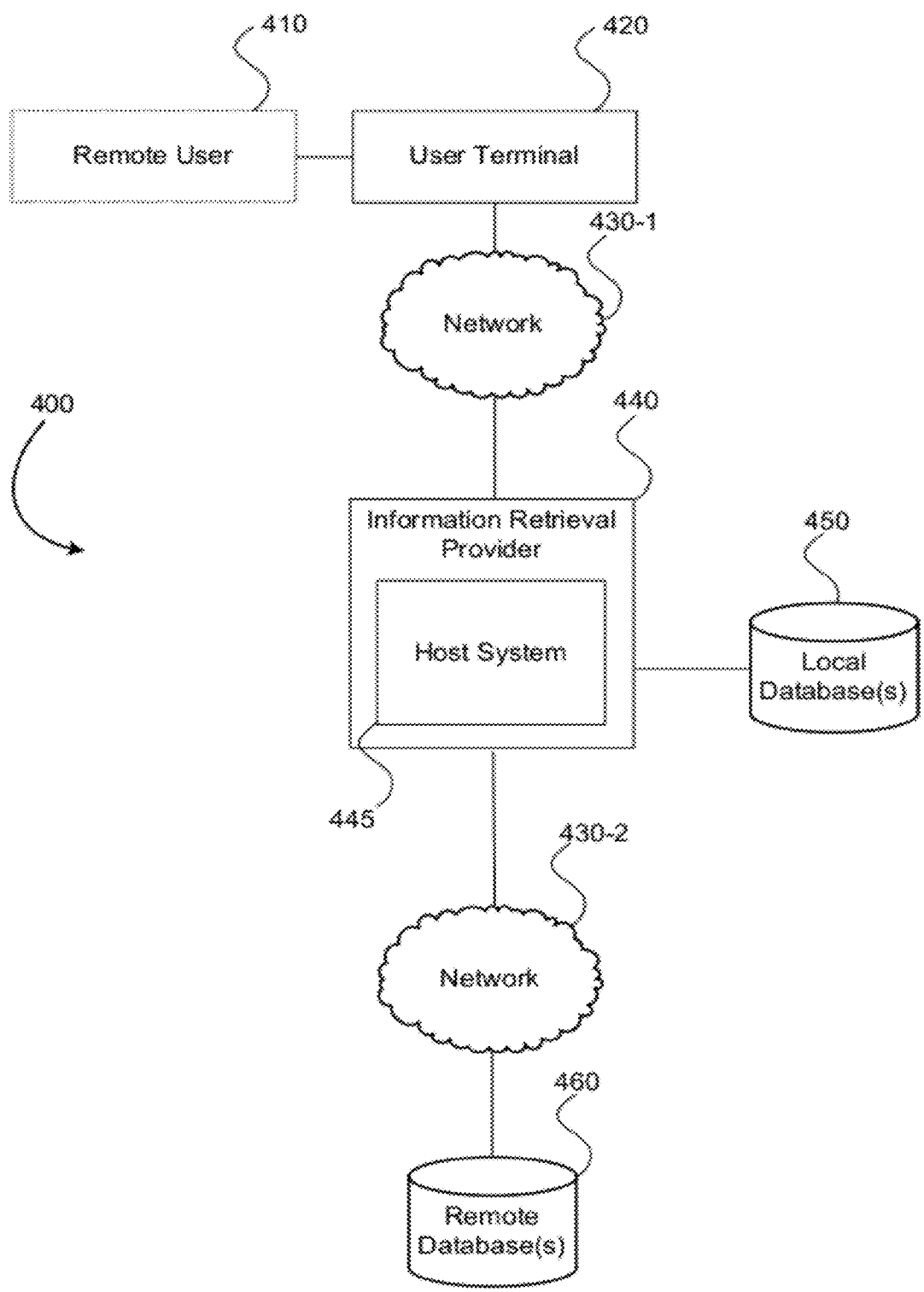
FIG. 4 is a simplified block diagram of an embodiment of a information retrieval system for consolidating information retrieval results.

Computer systems such as those described in FIG. 3, may comprise part of larger information retrieval systems such as those illustrated in FIG. 4. FIG. 4 illustrates a simplified block diagram an information retrieval system, which can be used to retrieve, upload, and/or edit documents, records, and/or other electronically stored information. Such a system 400 may include: a host system 445 of an information retrieval provider 440 and a local database 450 and/or a remote database 460. The remote database may be accessed over a network 430-2. The network 430-2 may be public, such as the Internet, or private, such as a private intranet. The network 430-2 may be the same network as network 430-1. Alternatively, the network 430-2 used to access the database 460 may be a network (such as an intranet) different from the network 430-1 (such as the Internet) used to interact with the user terminal 420. A local database 450 may be stored on the host system 445 a variety of ways, as described above.

The host system 445, can receive a query from user terminal 420, which comprise a device such as a computer system 300 (or some other communicatively coupled device and/or method). The user terminal 420 can be operated by a remote user 410. The host system 445 can use the query to retrieve related results from local database 450 and/or remote database 460. The host system 445 can then consolidate retrieval results and communicate the results back to the user terminal 420 for display to the remote user 410. This exemplary system can be used in a variety of contexts, including but not limited to scenarios where a remote user 410 can retrieve, upload, and update records from database(s) 450 and/or 460. Such records can include genealogical records, real estate listings, electronic products, consumer reviews, restaurant information, etc. It will be understood that embodiments of the invention contemplate many different variations on this system. For instance, a user may connect directly to a host system 445, which accepts user input and displays consolidated results. Furthermore, networks 430-1 and 430-2 may comprise a combination of any number of networks including wireless, cellular, mobile, satellite, optical, coaxial, and other networks. The consolidation of the results may also be accomplished, in part or in whole, by a user terminal 420 receiving results from a host system 445.

Figure 5:
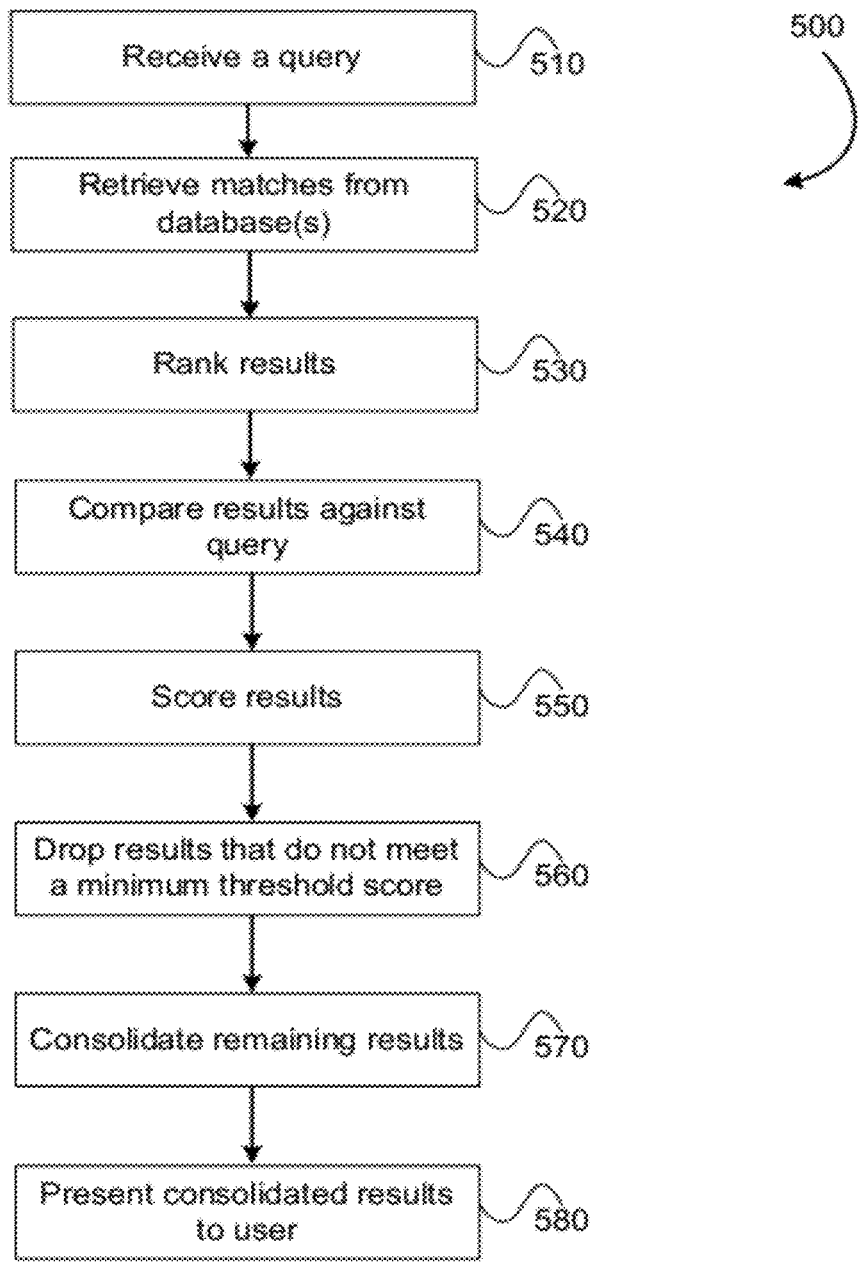
FIG. 5 is a simplified block diagram of an embodiment of a method for retrieving and consolidating information retrieval results.

FIG. 5 illustrates block diagram of an embodiment 500 of a method for retrieving and consolidating information retrieval results. In this embodiment, the method begins at block 510 with the receipt of a query. The query can come from a number of sources, such as a remote or local user, and can comprise search terms, logic, data types, etc.

At block 520 a first result set can be retrieved from one or more databases. The retrieval results can depend on the query and the type of search performed. For instance, the example in FIG. 2 illustrates a query to a database having genealogical records. The query search terms include "Reilly," "Jensen," and "Born: AZ." This latter term associates, for example, the term "AZ" with the data type "Born." It will be understood that a search of one or more databases may be performed in a variety of ways, which may depend on a number of factors, such as the format of the query and/or a defined of rules by which the information retrieval system conducts searches. The unconsolidated results 220 in example in FIG. 2, for instance, suggests the result set is based on an exact match with any of the terms in the query. That is, each of the results in the result set have at least one data element that exactly matches one or more of the search terms in the query. These results can then be ranked 530, based upon factors such as the number and/or type of data elements in a result that match a query search term. For instance, results with a high number of matches can receive a high rank, where results with few terms can receive a low rank.

Furthermore, data types may be given different weights. This allows for results containing matches that are considered to be more relevant to receive a higher rank than results with less relevant matches. For instance, using the example of search results obtained from a database having genealogical records, the name may be given more weight than the date of birth. Thus, a result matching only the name in a query may be given a higher rank than a result matching only the date of birth in the query.

At blocks 540 and 550 the results in the result set can then be compared against the query and given a score. This comparison can represent a more thorough ranking of the data elements in a results with the query. It can include, for example, analyzing and scoring data elements that do not exactly match a query term. The resulting score may can be weighted based on the correlation of the match. For example, a result containing the name "Bill" may be matched to the query term "William," and given a score, which may be weighted. A possible form of statistical analysis may involve evaluating the number of results that corroborate the match. As a simple example of such a statistical analysis in the context of genealogical records, if 100 records relate to the same person, with 90 spelling the person's name "Bryan" and the remainder spelling it "Brian," the ratio of "Bryan" to "Brian" would be 10:1. Such a ratio may result in a score of 0.9.

Further discussion of comparison techniques and associated scoring, either or both of which may be used in embodiments of the invention are described in co-pending, commonly assigned U.S. patent application Ser. No. 12/605,999, entitled "DEVICES, SYSTEMS AND METHODS FOR TRANSCRIPTION SUGGESTIONS AND COMPLETIONS," filed Oct. 26, 2009 by Lee Jensen and U.S. patent application Ser. No. 12/691,571, entitled "AUTOMATIC PEDIGREE CORRECTIONS," filed Jan. 21, 2010 by Lee Jensen, the entire disclosures of which are also herein incorporated by reference for all purposes.

At block 560, the results that do not meet a minimum threshold score can be dropped, or no longer used for further consolidation. In some embodiments, this can mean totaling all scores within each result to provide a total score for each result. Results with less than a minimum threshold total score then can be dropped or otherwise disregarded. Other embodiments contemplate dropping results not meeting minimum threshold score for one or more individual data elements. Alternatively, or in addition, some data within a particular result may be dropped if it does not meet a minimum threshold, while other data within that result is retained for consolidation. For example, in a query of genealogical records, if nine of ten results indicate a birth date for a particular person of 1929 and the tenth had a birth date of 1930, the birth date of the tenth result can be dropped. However, other data within the tenth record, including novel information, may be kept for consolidation.

Embodiments of the invention contemplate different methods of setting a threshold score. In some embodiments, the threshold may be set by the information retrieval system. This can take into account the type of information retrieval, past, and/or related searches, and similar information. In other embodiments, the threshold may be set by user input, depending on how the user desires the results to be displayed. It will be understood that any combination of user- and system-defined variables may be used to set a threshold level.

At block 570, the remaining results are then consolidated by comparing data elements among the remaining results. Using matching and scoring techniques similar to those described above, linkage algorithms are used to determine if one or more results represent a distinct entity or topic and should be consolidated. Such algorithms are discussed in further detail in the U.S. patent application Ser. Nos. 12/605, 999 and 12/691,571 referenced above. These algorithms work by determining the similarity of two results based upon the similarity of the data elements represented by the results. If the similarity reaches a prescribed threshold, then the results are consolidated. As with the threshold for determining which results to drop, the threshold to determine the similarity of two results may also be defined by any combination of user- and system-defined variables.

Consolidated information may combine data elements representing any type of data represented by the source database. For example, names, dates, places, photographs, stories, military status, price, reviews, relationships, phone numbers, identification numbers, race, gender, residence, employer, employment, education, criminal records, tax records, religion, political service, dimensions, medical records, or DNA sequences. By identifying and consolidating the data elements in a list of results dynamically at query time, instead of when the content collection is created, the system can be incrementally updated without having to reconsolidate the entire collection. This is especially desirable if only a portion of the collection is actually used in the majority of user queries.

The consolidated result provides a distinct single data element for all duplicated data elements, but retains a count and source of results representing each consolidated data element. That count can be used later on for scoring the probability of a match to the original user's query. Once the resulting results have been consolidated, the consolidated results can then be scored against the user's query and ranked, in a similar ranking process as described above. The rank order can be influenced by the completeness of the consolidated result. In such a situation a consolidated result that matched the user's query equally but had more information than other records, for instance, can score higher. Once the consolidated results are scored, they can be displayed to the user 580. Because the count and source of the results representing each consolidated data element in a consolidated result are retained, this information may also be displayed to the user along with the data elements in the consolidated results.

Figure 6:
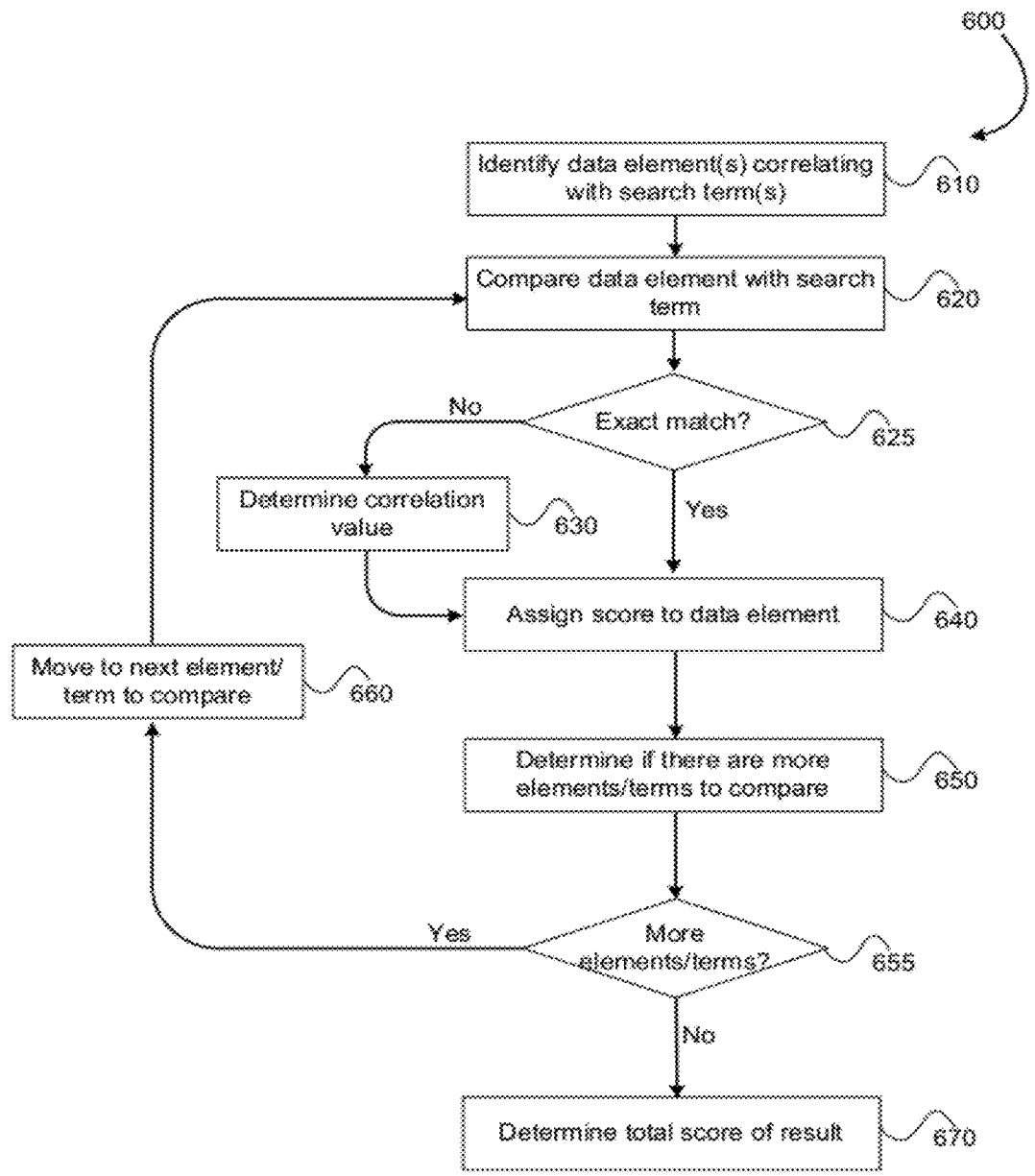
FIG. 6 is a simplified block diagram of an embodiment of a method for scoring results in a result set.

FIG. 6 is a simplified block diagram of an embodiment 600 of a method for scoring results in a result set. As discussed above, after an initial result set is created, the results can then be compared more thoroughly to the user's query. Moreover, scoring may also be used during a comparison of data elements between two results. This provides the ability to quantify the correlation between two terms, and ultimately provides for the overall scoring and ranking of results.

The method begins at block 610, where data elements to compare are identified. For databases with a common schema, data types may be included in the comparison. For instance, for a database having genealogical records, a query may require a user to enter the name and birthplace of a person to search. Each data element, the name (which could include separate data points for first, middle, and last names) and the birthplace could be associated with a data type. In this case, the data elements can be compared with results based on the data type—the name in the query compared with results containing names, and the birthplace in the query compared with results containing birthplaces. It will be understood that a common schema may be very simple, such as only containing a name field and associated text.

At blocks 620 and 625, the data elements then can be compared with the search term or other data elements for scoring. If the data elements do not exactly match, the non-identical data elements can be compared as described above, determining a correlation value 630. This correlation value may be used to calculate a score, which is assigned to the data element 640. For example, on a scale of 0 to 1, an exact match can result in a score of 1. A strongly-correlated data element can be given a score of nearly 1 where a weakly-correlated data element can be given a score of nearly 0. For either type of match, exact or not, the data elements may additionally be weighted according to traits such as relevance, which can impact the score as described above.

The process of scoring results can continue by determining if there are more data elements or terms to compare 655. If so, the process will move to the next terms to compare 660. Once all data elements for comparison within a result have been scored, a total score of a result may be determined 670.

Figure 7:
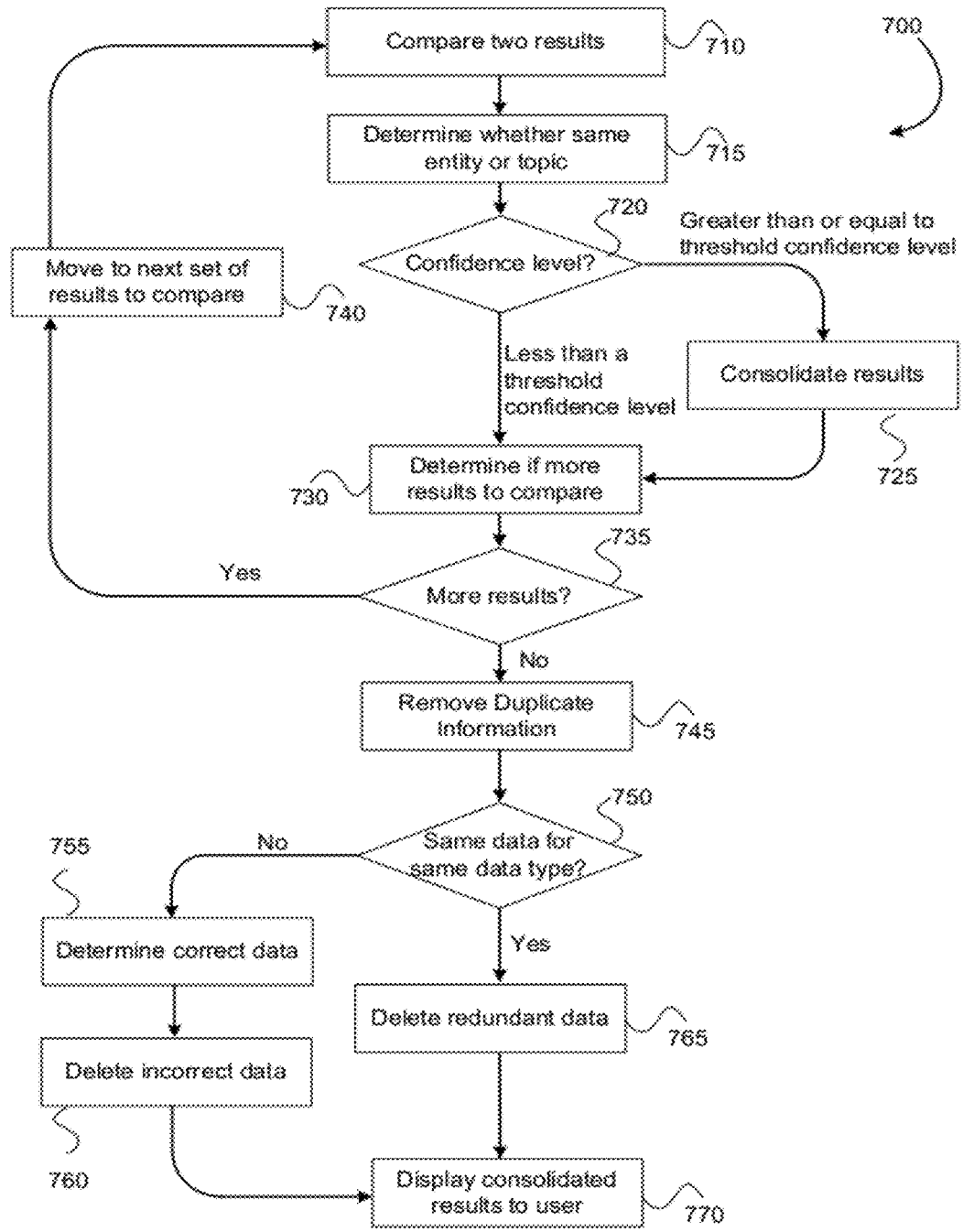
FIG. 7 is a simplified block diagram of an embodiment of a method for comparing and consolidating results in a result set.

Referring now to FIG. 7, a simplified block diagram of an embodiment 700 of a method for comparing and consolidating results in a result set is shown. Generally speaking, embodiment 700 can correlate with blocks 570 and 580 of embodiment 500 of a method for retrieving and consolidating information retrieval results, although it will be understood that embodiment 700 of a method for comparing and consolidating results can be incorporated into the invention in various other ways.

The method of comparing and consolidating results can begin with block 710, where the data elements of two results are compared. Such a comparison can further include a determination of whether the results include information on the same entity or topic 715, which can be performed by linkage algorithms as discussed above. Algorithms can include a usage of a confidence level 720 reflecting a measurement of the correlation of one or more data elements between the two records, whereby records having a confidence level at or above a certain threshold confidence level are consolidated 725. The method then cycles through the results by determining whether there are more results to compare 730 and, if so, moving to the next set of results to compare 740.

Although it will be understood that removing duplicate information, in part or in whole, may occur while results are being compared or at other times, removing duplicate information may occur after results are consolidated, as indicated by block 745. Removing duplicate information can involve determining whether consolidated results include the same data for the same data type 750. Where the data elements are determined to be the same, the redundant data simply can be removed 765, the consolidated result retaining only one instance of the data element. For instance, in FIG. 2., where unconsolidated results 222, 223, 224, and 225 each include the name "Reilly Jensen," a consolidated result before removing duplicate information may have many instances of the name "Reilly Jensen." The removing duplicate information process would then eliminate recurrences of the name, ultimately providing one occurrence of the name "Reilly Jensen" in the final consolidated result.

Where data elements for a single data type within a consolidated result are not identical, removing duplicate information can include a determination of the "correct" data 755, or the data to include in the final consolidated result, after which the "incorrect" data may be deleted 760 or otherwise excluded from the final consolidated result, which then can be displayed to the user 770. It should be noted that a determination of the "correct" data to display may include the comparison techniques described above and discussed in incorporated U.S. patent application Ser. Nos. 12/605,999 and 12/691,571. Moreover, this can include comparing the data elements to determine which data element has the strongest correlation value to the original query, determining which data element is most common among redundant data elements, or other known techniques.

It will be understood that the invention contemplates other embodiments for consolidation and removing duplicate information in results. It will also be understood that the embodiment 700 may be repeated, in part or in whole, to produce multiple consolidated records, each of which can contain information about a distinct entity or topic. These consolidated results, along with any unconsolidated results may also be displayed to the user.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for consolidating information retrieval results from one or more databases, the method comprising:
   creating, at a computer system, a result set in response to a query, wherein each result in the result set has a relevance value indicating a relevance of the result in relation to the query, the relevance value being at or above a minimum threshold relevance value, and wherein any result not having a relevance value at or above the minimum threshold relevance value is dropped from the result set;
   consolidating the result set by:
      determining, at a confidence level at or above a threshold confidence level, that at least two results in the result set include information about the same entity or topic,
      creating a consolidated result including information from the at least two results, and
      removing duplicative information included within the consolidated result; and
   displaying, at a display device, the consolidated result.

2. The method for consolidating information retrieval results as recited in claim 1, wherein each result in the result set includes one or more data elements, and the method further comprises comparing, for each result in the result set, the one or more data elements of the result with one or more search terms in the query to determine the value of the result.

3. The method for consolidating information retrieval results as recited in claim 1, further comprising displaying one or more results from the result set.

4. The method for consolidating information retrieval results as recited in claim 3 wherein the displayed results from the result set include only those results with information not used to create the consolidated result.

5. The method for consolidating information retrieval results as recited in claim 1 wherein consolidating the result set comprises creating multiple consolidated results, each consolidated result including information about a distinct entity or topic.

6. The method for consolidating information retrieval results as recited in claim 5 wherein the consolidated results are displayed in an order, the order determined by at least one of the following:
   an amount of information included in each of the consolidated results,
   a type of information included in each of the consolidated results,
   a correlation of the information included in a consolidated result with one or more search terms in the query, or
   values of records from which each of the consolidated results were consolidated.

7. The method for consolidating information retrieval results as recited in claim 1 wherein the result set comprises records having a common schema.

8. The method for consolidating information retrieval results as recited in claim 1 wherein the consolidated result includes at least one of the following types of information: a name, date, place, photograph, story, military status, price, review, relationship, phone number, identification number, race, gender, residence, employer, employment, education, criminal records, tax record, religion, political service, dimension, medical record, or DNA sequence.

9. The method for consolidating information retrieval results as recited in claim 1 wherein the relevance value for each result represents a total value, the method further comprising:
   associating a weighted relevance value to each of one or more search terms in the query; and
   calculating the total value for each result using the weighted relevance value of each search term in the query.

10. The method for consolidating information retrieval results as recited in claim 1 wherein:
    the value for each result represents a total value;
    each result in the result set includes one or more data elements; and
    the method further comprises:
    associating weighted values to each data element of each result; and
    calculating the total value for each result using the weighted values.

11. The method for consolidating information retrieval results as recited in claim 1 wherein one or both of the minimum threshold relevance value and the threshold confidence level is determined, at least in part, by input from a user.

12. The method for consolidating information retrieval results as recited in claim 1 wherein one or both of a source and a count of the at least two results are displayed at the display device.

13. A system for providing consolidated information retrieval results, the system comprising
    a network interface through which the system is communicatively coupled with a user terminal;
    one or more databases;
    a memory;
    a processor that executes an application stored in the memory, the application adapted to conduct information retrieval and having one or more programmed routines, the programmed routines comprising:
       a routine for creating, at a computer system, a result set in response to a query, wherein each result in the result set has a relevance value indicating a relevance of the result in relation to the query, the relevance value being at or above a minimum threshold relevance value, and wherein any result not having a relevance value at or above the minimum threshold relevance value is dropped from the result set;

a routine for consolidating the result set by:
determining, at a confidence level at or above a threshold confidence level, that at least two results in the result set include information about the same entity or topic,
creating one or more consolidated results including information from the at least two results, and
removing duplicative information contained within each of the one or more consolidated results; and a routine for communicating the one or more consolidated results to the user terminal.

14. The system for providing consolidated information retrieval results as recited in claim 13, wherein each result in the result set includes one or more data elements, and the programmed routines further comprise a routine for comparing, for each result in the result set, the one or more data elements of the result with one or more search terms in the query to determine the relevance value of the result.

15. The system for providing consolidated information retrieval results as recited in claim 13, wherein the programmed routines further comprise a routine for communicating one or more results from the result set.

16. The system for providing consolidated information retrieval results as recited in claim 13, wherein the routine for consolidating the result set comprises creating multiple consolidated results, each consolidated result including information about a distinct entity or topic.

17. The system for providing consolidated information retrieval results as recited in claim 13 wherein the relevance value for each result represents a total value, the programmed routines further comprising:
a routine for associating a weighted relevance value to each of one or more search terms in the query; and
a routine for calculating the total value for each result using the weighted relevance value of each search term in the query.

18. A computer-readable storage medium having a computer-readable program embodied therein for causing one or more processors to consolidate information retrieval results from a plurality of retrieval results, the computer-readable program comprising instructions for:
creating a result set in response to a query, wherein each result in the result set has a value indicating a relevance of the result in relation to the query, the value being at or above a minimum threshold value, wherein the value for each result represents a total value and wherein each result in the result set includes one or more data elements;
associating weighted values to each data element of each result;
calculating the total value for each result using the weighted values,
consolidating the result set by:
determining, at a confidence level at or above a threshold confidence level, that at least two results in the result set include information about the same entity or topic,
creating one or more consolidated results including information from the at least two results, and
removing duplicative information contained within each of the one or more consolidated results; and
displaying the one or more consolidated results on a display device.

19. A method for consolidating information retrieval results from one or more databases, the method comprising:
creating, at a computer system, a result set in response to a query, wherein each result in the result set has a value indicating a relevance of the result in relation to the query, the value being at or above a minimum threshold value;
consolidating the result set by:
determining, at a confidence level at or above a threshold confidence level, that at least two results in the result set include information about the same entity or topic,
creating a consolidated result including information from the at least two results, and
removing duplicative information included within the consolidated result; and
displaying, at a display device, the consolidated result;
wherein consolidating the result set comprises creating multiple consolidated results, each consolidated result including information about a distinct entity or topic; and
wherein the consolidated results are displayed in an order, the order determined by at least one of the following:
an amount of information included in each of the consolidated results,
a type of information included in each of the consolidated results,
a correlation of the information included in a consolidated result with one or more search terms in the query, or
values of records from which each of the consolidated results were consolidated.

20. A method for consolidating information retrieval results from one or more databases, the method comprising:
creating, at a computer system, a result set in response to a query, wherein each result in the result set includes one or more data elements and a total value indicating a relevance of the result in relation to the query, the total value being at or above a minimum threshold value, wherein weighted values are associated with each data element of each result, and wherein the total value for each result is calculated using the weighted values;
consolidating the result set by:
determining, at a confidence level at or above a threshold confidence level, that at least two results in the result set include information about the same entity or topic,
creating a consolidated result including information from the at least two results, and
removing duplicative information included within the consolidated result; and
displaying, at a display device, the consolidated result.

* * * * *